United States Patent Office 2,870,026
Patented Jan. 20, 1959

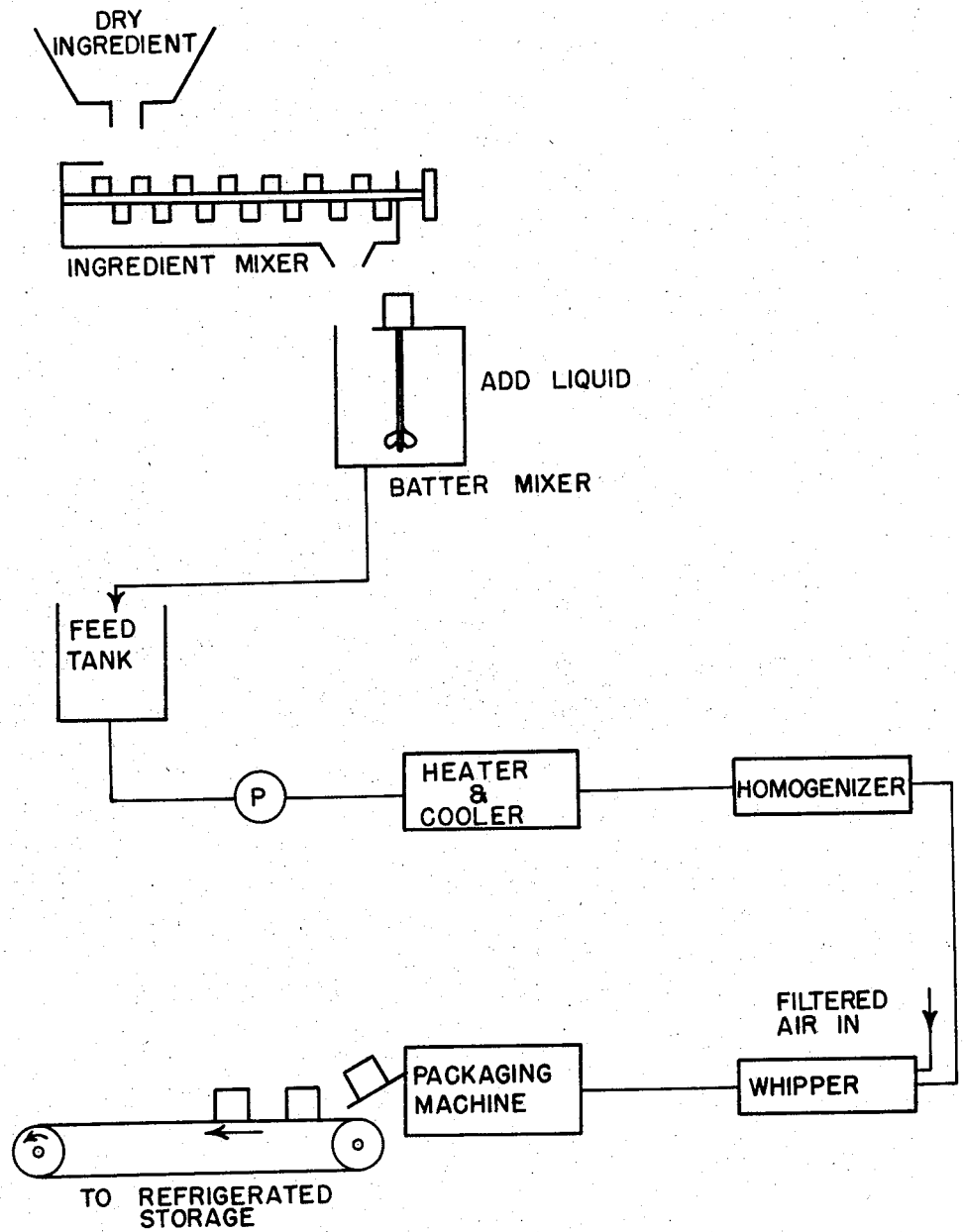

2,870,026
PROCESS FOR MAKING A REFRIGERATED BATTER

Harold M. Keller, St. Paul, Minn., and Roderick Gerald Beck, Idaho Falls, Idaho, assignors to General Mills, Inc., a corporation of Delaware Application March 17, 1958, Serial No. 722,366

7 Claims. (Cl. 99—192)

The present invention relates to a novel refrigerated baking batter product and to a process of producing it. The present application is a continuation-in-part of our copending application Serial No. 669,676, filed July 2, 1957, entitled Baking Batter. By the term "refrigerated batter" as used herein it is intended to cover batters which are stored and merchandised in a refrigerated but unfrozen condition. Generally such products are kept at around 40° F.

No great problem appears to be involved in the preparation of baking batters on a commercial basis where such batters are intended to be baked into finished products almost immediately. When, however, it is attempted to package such batters and store them for reasonable periods of time, as would be necessary in the commercial marketing of such a batter, it is found that the batters deteriorate quite rapidly and when baked after a reasonable storage period the baked products are far inferior.

It is an object of the present invention to provide a novel refrigerated batter which may be stored for extended periods of time under typical refrigeration conditions and which is capable of producing a satisfactory baked product after such a period of storage. It is a further object of the present invention to provide a process of producing such a batter.

The deterioration of ordinary batters stored under refrigeration usually involves a syneresis or separation of the solid from the liquid phase. When this occurs it is necessary to redisperse the solids in the liquid phase. In the present invention it has been discovered that it is possible to stabilize the batter emulsion by subjecting the batter to a heat treatment under carefully controlled conditions. In general this stabilization involves the heating of the batter at temperatures within the range of 145–185° F. for periods of time of from about 10 minutes at 145° F. to 10 seconds at 185° F. Heat treatment for longer periods than 10 minutes at 145° F., for example, up to 30 minutes, resulted in some improvement in stability over the 10 minute period but the increase in stability did not appear to be significantly greater and the extended time period would probably not be warranted commercially. The heat treatment appears to modify the flour constituent in such a way that it stabilizes the batter emulsion.

At treatment temperatures below 145° F. the batters after even relatively short storage periods become soft, and the volume of the product baked from such a batter is reduced materially. Moreover, the grain characteristics and the crust are of inferior quality. Generally, the best results appear to be attainable within the range of 160–175° F. at time periods of from 10–120 seconds.

It is preferred that the heating be performed in such a manner that both the maximum temperatures and the duration of the heating can be carefully controlled. It is preferred, therefore, to employ a device which is capable of rapidly heating the batter to the optimum temperatures and of rapidly cooling it to a safe lower temperature after the proper period of treatment.

In the drawing filed herewith there is illustrated diagrammatically the preferred manner in which the process should be carried out. Preferably there is a preliminary mixing of the typical dry ingredients to be incorporated in the batter, such as sugar, flour, shortening, leavening, etc. This preliminary mixing is for the simple purpose of preparing a substantially uniform blend. In the event that dry egg solids are used, these may be incorporated with the other dry ingredients. In those instances in which the stabilization treatment is to be of several minutes' duration, it may be preferred to add the leavening ingredients after the stabilizing step. The blend of dry ingredients is then added to the batter mixer where the liquid such as water or milk and liquid eggs (if used) are added and the mixture thoroughly agitated. Liquid sugar may be used as part or all of the sugar component. Liquid sugar is preferably added at the time of the addition of the other liquid components. This material then flows to a feed tank from which it is pumped through the heater and cooler.

Several devices may be used for this latter purpose. A suitable piece of equipment is the typical plate type of dairy heat exchanger which serves to heat and cool the batter very rapidly. Another type of heat exchanger which may be used for this purpose is the type sold under the trademark Votator. This type of heat exchanger is composed of a jacketed tube equipped with a scraper blade on the inside of the tube. By means of each of these types of heat exchangers it is possible carefully to control the maximum temperature reached by the batter as well as the time of the treatment. Any other heat exchange device which permits control of the temperature and time of treatment may be used.

Following the stabilization treatment the batter is cooled to prevent any substantial further change. In the event that the batter contains the leavening ingredients during the stabilization treatment of the batter should be cooled rapidly to temperatures below 120° F. but above the freezing point of the batter, to prevent any deterioration of the leavening ingredients. On the other hand, if the leavening ingredients are not present during the stabilization treatment the cooling can be more gradual as long as the total heat effect does not modify the batter beyond the stage desired. Thus if the batter contains the leavening ingredients, it should be cooled to a temperature between the freezing point of the batter and 120° F. rapidly. If the batter does not include the leavening ingredients, it should be cooled to a temperature between the freezing point of the batter and 145° F. to prevent any further substantial change. In any event, the period of time during which the batter is above 120° F. while it contains the leavening ingredients should be kept as short as possible.

Following the cooling, the batter is passed through a typical dairy type homogenizer. For best results, the homogenizer is operated with the pressure maintained at from 1,000 to 1,500 pounds per square inch and the batter temperature kept between 75–100° F. After the batter has been homogenized it is passed to a whipper for the incorporation of additional quantities of air or an inert gas such as nitrogen. This whipper may be essentially the same type of construction as the Votator heat exchanger referred to above, which is the type typically employed in the preparation of plastic shortenings. It is equipped with a source of air or inert gas for the purpose of introducing such a gas into the product, to reduce the specific gravity of the batter from approximately 1.1 to within the range of 0.6 to 0.9.

The batter is maintained at a temperature of 45–75° F. during the whipping operation. In commercial practice if a heat exchanger of the above type is used for whipping, the batter may enter the whipper at 90–110° F. but is generally cooled in the whipper to a temperature of 45-75° F. preferably around 60° F.

As the batter comes from the whipper it may be suitably packaged as, for example, in hermetically sealed cans which are then forwarded to refrigerated storage. Any other suitable type of packaging may be employed.

A series of batters was made up from the following formulas:

*White cake*

| | Percent |
|---|---|
| Sugar | 30.0 |
| Flour | 24.0 |
| Shortening | 8.5 |
| Non-fat milk solids | 2.5 |
| Minor ingredients (leavening, salt, etc.) | 2.0 |
| Liquid egg whites | 8.7 |
| Water | 24.3 |

*Yellow cake*

| | |
|---|---|
| Sugar | 29.3 |
| Flour | 23.0 |
| Shortening | 8.5 |
| Non-fat milk solids | 2.2 |
| Minor ingredients (leavening, salt, etc.) | 2.0 |
| Liquid whole eggs | 10.3 |
| Water | 24.7 |

*Devil's food cake*

| | |
|---|---|
| Sugar | 29.0 |
| Flour | 19.0 |
| Shortening | 9.0 |
| Cocoa | 4.0 |
| Non-fat milk solids | 1.5 |
| Minor ingredients (leavening, salt, etc.) | 1.5 |
| Liquid whole eggs | 10.6 |
| Water | 25.4 |

The solid ingredients were blended first for uniformity after which the eggs and water were added and the mixture agitated until a suitable degree of uniformity was obtained. The batter was then passed through a dairy type plate heat exchanger in which it was heated to a maximum temperature of 165-175° F. in one section of the heat exchanger and then cooled to 90-110° F. in the other section. The total time for passage through the two sections of the heat exchanger was approximately 45 seconds. The batter was then passed through a three-piston, two-stage homogenizer at pressures within the range of 1,000-1,500 pounds per square inch. The specific gravity of the batter at this point was approximately 1.1. The batter was then passed through a chiller and aerator in which it was cooled to about 60° F. and in which the specific gravity was reduced to about 0.75. The batter was sealed in airtight cans and stored at 40° F. After three days of storage under these conditions the batter was baked and the results are indicated in the following table. For comparison purposes the properties of a yellow cake baked from a batter which was identical in all respects except that it had not been subjected to the stabilization heat treatment are also indicated in the table.

*Comparison of cakes (batter storage 40-50°)*

| Treatment of Batter | Storage | Batter Characteristics Before Baking | Volume, cc. | Crust | Grain | Tenderness |
|---|---|---|---|---|---|---|
| Yellow: | | | | | | |
| Unheated | 3 days | Soft, bubbly, stringy | 935 | 5 | 6 compact | 6 layered |
| Heated | do | Smooth, firm | 1,330 | 10 | 9.5 | 10 |
| Do | 4 weeks | do | 1,380 | 9.5 | 9 | 10 |
| White: | | | | | | |
| Heated | 3 days | do | 1,380 | 10 | 10 | 10 |
| Do | 4 weeks | Mod. Smooth, firm | 1,305 | 9 | 9 | 10 |
| Devil's Food: | | | | | | |
| Heated | 3 days | Smooth, firm | 1,330 | 10 | 10 | 10 |
| Do | 4 weeks | do | 1,305 | 9 | 10 | 10 |

Scoring on basis of 0-10.

Similar products were made and stabilized at lower temperatures between 145-160° F. At the lower temperatures the time varied from 10-30 minutes. At the 145° temperature the time varied from 10-30 minutes. At temperatures slightly below 160° F. the time was less than one minute. These products have definite improvements over unstabilized batters but the period for which the products could be stored and still make acceptable cakes was shorter than the storage period possible with batters stabilized in the range of 160-175° F. When the batters were stabilized at 175-185° F. for time periods of less than one minute, the batter appeared to be adequately stabilized but the volume and grain of the cakes made from these batters were slightly inferior to these properties of cakes made from batters stabilized at temperatures within the range of 160-175° F.

While the examples show certain specific formulations and conditions of treatment, it will be apparent that considerable variation is possible in both of these factors without departing from the spirit of the invention. The invention is particularly applicable to high ratio cake batters, that is, those having a ratio of sugar to flour in excess of 1. It is, however, applicable to a wide variety of batters useful for other purposes. These batters have a sugar to flour ratio varying in the range of 80-150 parts of sugar per 100 parts of flour.

Now, therefore, we claim:

1. Process of making a stable refrigerated batter which comprises preparing a batter; subjecting the batter to a stabilization treatment at a temperature within the approximate range of 145-185° F. for a period within the range of 10 seconds to 30 minutes, the longer time period being employed at the lower temperature; and cooling the batter to a temperature above the freezing point thereof but below 145° F. and below 120° F. in the event that the batter contains leavening ingredients.

2. A process according to claim 1 in which the cooled batter is subjected to a whipping treatment for the purpose of incorporating gas bubbles.

3. A process according to claim 2 in which the batter is homogenized prior to being subjected to the whipping treatment.

4. A process according to claim 3 in which the batter is packaged for refrigeration after being whipped.

5. Process of making a stable refrigerated batter which comprises preparing a batter, subjecting the batter to a stabilization treatment at a temperature within the approximate range of 160-175° F. for a period within the range of 10 to 120 seconds, and rapidly cooling the batter to a temperature above the freezing point of the batter but below 120° F.

6. A process of making a stabilized batter which comprises preparing a batter, subjecting the batter to a temperature within the approximate range of 160–175° F. for a period of from 10 to 120 seconds, rapidly cooling the batter to a temperature between room temperature and 120° F., homogenizing the batter, whipping air into the batter, cooling the batter to approximately 60° F., and packaging the batter.

7. A process according to claim 6 in which the batter has a specific gravity of approximately 1.1 prior to the whipping treatment and in which the batter has a specific gravity within the range of 0.6 to 0.9 after whipping.

References Cited in the file of this patent

UNITED STATES PATENTS

| | | |
|---|---|---|
| 2,197,820 | Voss | Apr. 23, 1940 |
| 2,211,678 | Voss | Aug. 13, 1940 |
| 2,524,437 | Garnatz et al. | Oct. 3, 1950 |